Oct. 19, 1954                R. L. WILCOX                2,692,149
                          WHEELED TOWING DEVICE
Filed March 10, 1954                                2 Sheets-Sheet 1
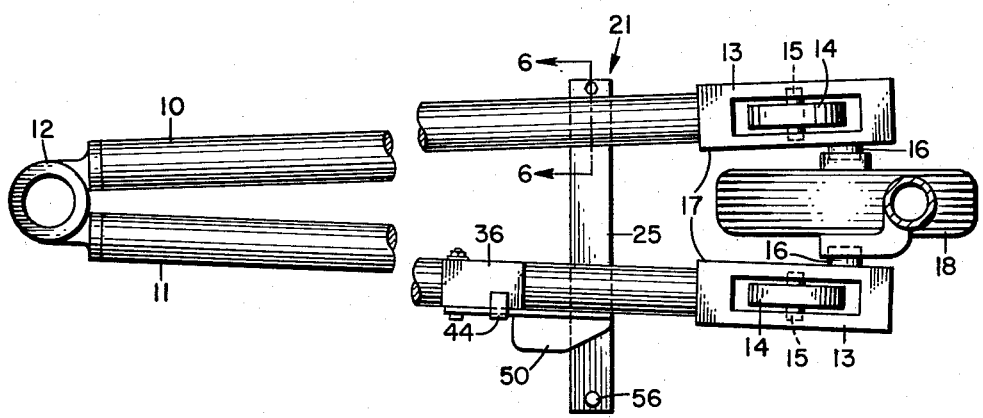
FIG. 1
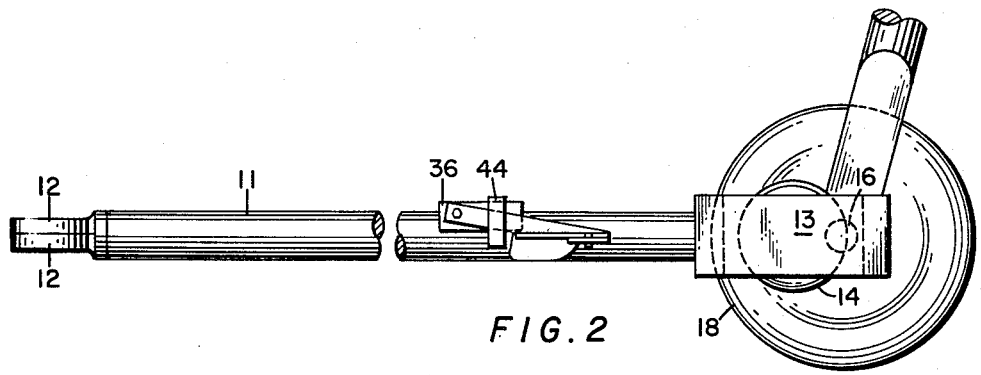
FIG. 2
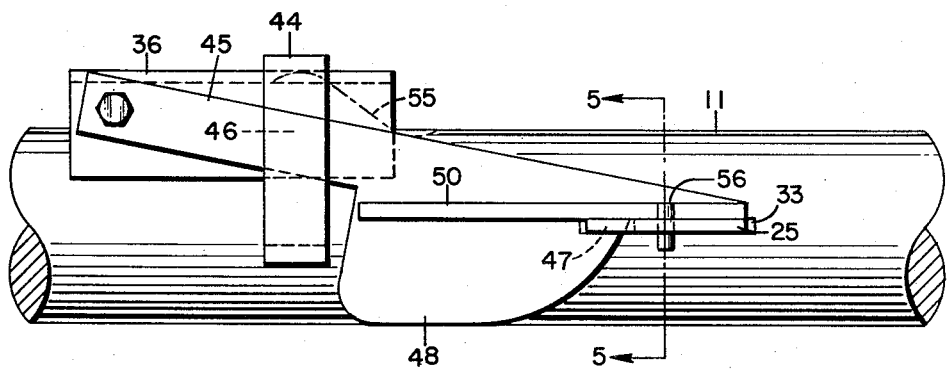
FIG. 3
INVENTOR
ROBERT L. WILCOX
BY 
ATTORNEY Oct. 19, 1954     R. L. WILCOX     2,692,149
WHEELED TOWING DEVICE Filed March 10, 1954                                  2 Sheets-Sheet 2

INVENTOR
ROBERT L. WILCOX

BY

ATTORNEY

Patented Oct. 19, 1954

2,692,149

UNITED STATES PATENT OFFICE 2,692,149

WHEELED TOWING DEVICE

Robert L. Wilcox, Oxnard, Calif.

Application March 10, 1954, Serial No. 415,453

8 Claims. (Cl. 280—476)

(Granted under Title 35, U. S. Code (1952), sec. 266)

The invention described herein may be manufactured and used by or for the Government of the United States of America for governmental purposes without the payment of any royalties thereon or therefor.

The present invention relates to a towing device and more particularly to a towing device having a novel locking arrangement wherein the device is positively locked in position during operation.

The invention device may be used for towing any type of vehicle or similar means, but is particularly adapted for use in towing aircraft. The device is of the "scissors" type, and similar devices of this type are well known in the art. Such devices generally employ pin or cup means at one end thereof adapted to engage a complementary fitting formed on the hub of one of the wheels of an aircraft. The opposite ends of such towing devices are generally connected to a small tractor or tug, and when one of these devices is in engaged position with an aircraft wheel and locked in position, the aircraft may be towed to a desired position whereupon the towing device is unlocked and disconnected from the aircraft wheel.

Prior art devices utilize pin connections and the like to lock them in operative position, but these arrangements have proven unsatisfactory in operation since they occasionally become accidentally unlocked while an aircraft is being towed. Accidental unlocking of the towing device during operation endangers personnel working therewith and may also cause the aircraft to be damaged. Aircraft have also been accidentally released from known towing devices because of excessive wear of the connections which engage the aircraft wheel and because of failure of the pivotal connection between the two main elongated members of the devices. Such excessive wear and failure are caused by undesired turning of the main members of the devices which occurs due to the fact that the main members of the devices are not adequately crossbraced.

The present invention prevents accidental unlocking of the towing device by providing a positive locking connection between a lock bar and a latch member. Furthermore, the lock bar of the present invention is slidably positioned within longitudinal slots formed in the two main elongated members thereof, thereby preventing these members from undesired turning movement.

An object of the present invention is the provision of a new and novel towing device employing an arrangement which prevents accidental unlocking thereof.

Another object is to provide a new and novel towing device which is so constructed and arranged as to prevent undesired turning movement of the two main elongated members thereof.

A further object of the invention is the provision of a new and novel towing device which is simple and inexpensive in construction, yet sturdy and reliable in operation.

Other objects and many of the attendant advantages of this invention will be readily appreciated as the same becomes better understood by reference to the following detailed description when considered in connection with the accompanying drawings wherein:

Fig. 1 shows a plan view of the invention;

Fig. 2 illustrates a side elevation of the device shown in Fig. 1;

Fig. 3 is an enlarged view of a portion of the device shown in Fig. 2;

Figure 4:
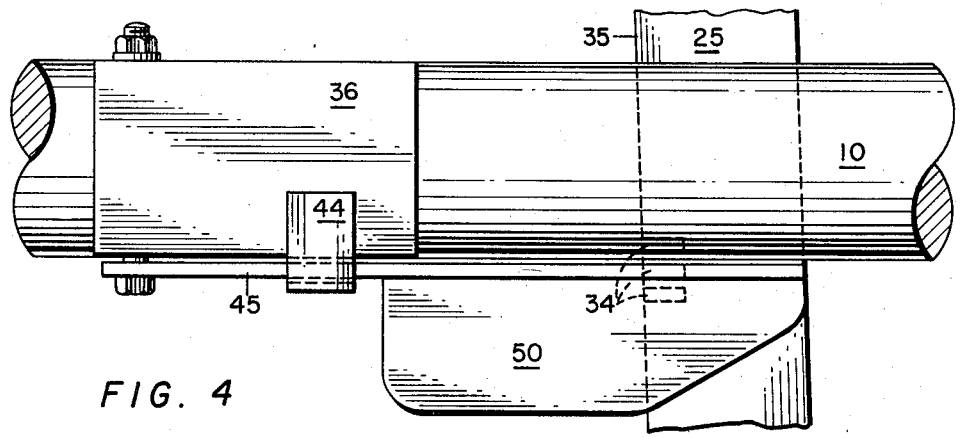
Fig. 4 is an enlarged view of a portion of the device shown in Fig. 1.

Referring now to the drawings wherein like reference characters designate like or corresponding parts throughout the several views, there is shown in Figs. 1 and 2 two similar elongated tubular members 10 and 11 each of which has a ring member 12 suitably connected to one end thereof, the ring members 12 of each tube having cooperating flanges formed thereon so as to permit rotational movement relative to one another while maintaining them in juxtaposition in a well-known manner. Identical hub members 13 are suitably connected to the opposite ends of tubular members 10 and 11, each hub member having a small wheel 14 fixed to a shaft 15 which is rotatably journaled in each of the hub members. Tow fittings 16 are suitably secured as by welding or the like to the inner surface 17 of the hub members, the tow fittings being adapted to engage complementary fittings formed on the hub of an aircraft wheel.

As most clearly seen in Fig. 1, oppositely facing fittings 16 in the form of pins are shown as being in engagement with complementary openings formed in the hub of an aircraft wheel 18 which in this case is the nose wheel of a tricycle landing gear. It is apparent that when members 16 are thusly locked in position relative to an aircraft wheel, the aircraft may be towed by connecting ring members 12 to a suitable fitting formed on a small tractor or tug.

Figure 6:
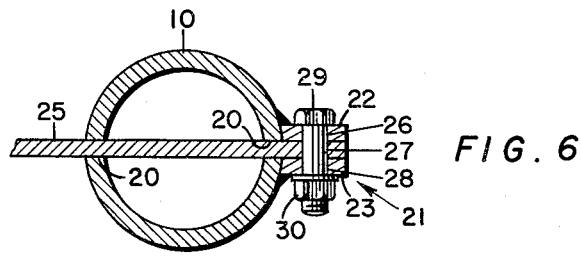
Fig. 6 is an enlarged sectional view taken on the line 6—6 of Fig. 1 looking in the direction of the arrows.

As most clearly seen in Fig. 6, a longitudinal slot 20 is formed in diametrically opposite portions of tube 10, and a bracket indicated generally by reference numeral 21 is formed of two plates 22 and 23 which are welded to the outer periphery of tube 10. A lock bar 25 is slidably positioned within slot 20 and an end portion thereof is disposed between plates 22 and 23. Aligned openings 26, 27 and 28 are formed in members 22, 25 and 23 respectively, and a bolt 29 passes therethrough, a nut 30 being provided for maintaining bolt 29 in position. In this manner, lock bar 25 is pivotally supported by bracket 21 which is welded to tube 10.

Figure 5:
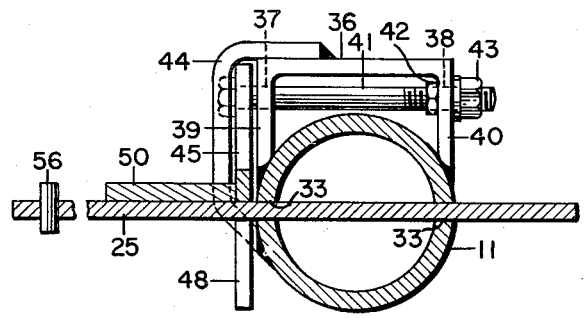
Fig. 5 is a sectional view taken on the line 5—5 of Fig. 3 looking in the direction of the arrows.

Lock bar 25 is also slidably disposed within a slot 33 formed in diametrically opposite portions of tube 11, the locking bar having a plurality of slots 34 formed in the edge 35 thereof. As most clearly seen in Fig. 5, a bracket 36 of substantially U-shaped cross-sectional configuration is welded to the outer periphery of tube 11 and has openings 37 and 38 formed in the opposite leg portions 39 and 40 respectively. A bolt 41 passes through openings 37 and 38, and nuts 42 and 43 are threaded on one end thereof for maintaining the bolt in fixed relation to the bracket.

A flat latch member 45 is pivotally mounted on the opposite end of bolt 41 and has an intermediate portion 46 thereof guided and limited in its pivotal movement by a guide member 44 which is welded at one end thereof to the top of bracket 36 and at the opposite end thereof to the outer periphery of tube 11. A locking portion 47 of member 45 is adapted to fit within one of the slots 34, and a downwardly extending flange 48 formed integral with member 45 provides additional weight which tends to pivot the latch member in a downward direction as seen in Fig. 3.

A plate 50 is welded at right angles to latch member 45 and serves the dual function of limiting downward movement of the latch member when in engagement with the upper surface of the locking bar and providing a convenient handle which may be manually grasped when it is desired to lift the latch member so as to disengage latching portion 47 from one of slots 34. Guide member 44 allows sufficient upward movement of the latch member such that locking portion 47 is clear of slots 36 and bar 25 may slide laterally within slot 33.

It is apparent that when pins 16 are in operative engagement with suitable fittings on an aircraft wheel the towing device may be positively locked by lowering latch member 45 until locking portion 47 thereof is positioned within one of slots 34 and plate 50 engages the upper surface of the lock bar. The device is then securely and positively locked in position and cannot release until the latch member is lifted to disengage portion 47 from the slots in the lock bar.

Although the weight provided by flange 48 is considered sufficient to prevent the latch member from accidentally bouncing out of engagement with the lock bar during towing, an additional safety feature may be incorporated in the device by providing a leaf spring which is indicated by phantom line 55 in Fig. 3 such that one end of the spring is secured to bracket 44 and the opposite end of the spring is in engagement with the upper lateral surface of member 45 whereby the latch member is continuously urged in a downward direction. It is evident that any number of slots 34 may be provided in bar 25 and that the spacing of the slots is dependent upon the width of the hub of the aircraft wheel to which the device is to be attached.

A pin 56 is fixed to the outer end of bar 25 and prevents excess rotation of tubes 10 and 11 away from one another when latch member 45 is in unlocked position. This permits the device to be backed into position without excessively spreading tubes 10 and 11 apart, and also prevents excessive spreading of the tubes when making turns with the tow device in unlocked position as may be the case when no aircraft is being towed.

Excessive wear of tow connections 16 and failure of the connection between rings 12 has occurred in prior art devices due to turning of members 10 and 11 about their longitudinal axes, such turning being caused by the loading applied thereon. It should be noted that flat bar 25 passing through longitudinal slots 20 and 33 in tubes 10 and 11 respectively prevents such turning of the tubes, thereby greatly reducing the wear on the tow fittings and the possibility of failure of the connection between rings 12.

It is evident that other types of tow fittings may be employed in place of fittings 16 in accordance with the type of fitting on the wheel of the aircraft to be towed. Additional tow fittings of various other configurations may be suitably secured to hubs 13 as by welding or bolting if desired.

It is apparent from the foregoing that there is provided a new and novel towing device employing an arrangement which prevents accidental unlocking thereof, and which is so constructed and arranged as to prevent undesired turning movement of the two main elongated members thereof. The device is simple and inexpensive in construction yet sturdy and reliable in operation.

Obviously many modifications and variations of the present invention are possible in the light of the above teachings. It is therefore to be understood that within the scope of the appended claims the invention may be practiced otherwise than as specifically described.

I claim:

1. A towing device which comprises a plurality of elongated members pivotally connected to one another at one end thereof, means supported by the opposite ends of said elongated members for engaging a device to be towed, lock bar means pivotally supported by one of said elongated members, a longitudinal slot formed in each of said elongated members, said bar means passing through said slots, latch means pivotally supported by the other of said elongated members, said bar means and said latch means having cooperating locking portions for locking said elongated members in position relative to one another.

2. A device as defined in claim 1 wherein said bar means is slidably mounted in said slots and is adapted to move relative thereto.

3. A device as defined in claim 2 including means supported by said bar means for preventing excess pivotal movement of said elongated members away from one another.

4. A towing device which comprises two elongated members pivotally connected to one another at one end thereof, means supported by the opposite ends of said elongated members for engaging a device to be towed, a lock bar pivotally supported by one of said elongated members, said bar having a slot formed in one edge thereof, a longitudinal slot formed in each of said elongated members, said bar being slidably disposed within each of said last mentioned slots, latch means pivotally supported by the other of said elongated members and having a locking portion adapted to be positioned within said slot in said tow bar whereby said elongated members are locked in position relative to one another.

5. A towing device which comprises two elongated tubular members pivotally connected to one another at one end thereof, means supported by the opposite ends of said tubular members for engaging a device to be towed, first bracket means connected to one of said tubular members, a lock bar pivotally supported by said first bracket means, a longitudinal slot formed in each of said tubular members, said bar being slidably disposed within each of said slots, second bracket means connected to the other of said tubular members, latch means pivotally supported by said second bracket means, said bar and said latch means having cooperating locking portions for locking said tubular members in position relative to one another, and means for guiding and limiting the pivotal movement of said latch means.

6. A device as defined in claim 5 including a handle portion connected to said latch means for manually moving said latch means.

7. A device as defined in claim 6 including a resilient means urging said latch means in one pivotal direction.

8. A towing device which comprises two elongated tubular members pivotally connected to one another at one end thereof, means supported by the opposite ends of said tubular members for engaging a device to be towed, a plurality of wheels rotatably supported adjacent said opposite ends, first bracket means connected to one of said tubular members, a lock bar pivotally supported by said first bracket means, a longitudinal slot formed in each of said tubular members, said bar being slidably disposed within each of said slots, means supported by said bar for preventing excess pivotal movement of said tubular members away from one another, second bracket means connected to the other of said tubular members, latch means pivotally supported by said second bracket and having a handle portion connected thereto, said bar and said latch means having cooperating locking portions for locking said tubular members in position relative to one another, means for guiding and limiting the pivotal movement of said latch means, and resilient means urging said latch means in one pivotal direction.

References Cited in the file of this patent

UNITED STATES PATENTS

| Number | Name | Date |
|---|---|---|
| 1,450,759 | Snyder | Apr. 3, 1923 |
| 2,287,955 | Zunino | June 30, 1942 |
| 2,340,273 | Phillips | Jan. 25, 1944 |
| 2,391,608 | Wood | Dec. 25, 1945 |
| 2,449,680 | Wak et al. | Sept. 21, 1948 |